US011169086B2

(12) United States Patent
Hokanson et al.

(10) Patent No.: US 11,169,086 B2
(45) Date of Patent: Nov. 9, 2021

(54) SYSTEM AND METHOD FOR SIMULTANEOUSLY PERFORMING MULTIPLE OPTICAL ANALYSES OF LIQUIDS AND PARTICLES IN A FLUID

(71) Applicant: Blaze Metrics, LLC, Carnation, WA (US)

(72) Inventors: Jon Victor Hokanson, Marysville, WA (US); Richard Philip Becker, Carnation, WA (US)

(73) Assignee: Blaze Metrics, LLC, Carnation, WA (US)

( * ) Notice: Subject to any disclaimer, the term of this patent is extended or adjusted under 35 U.S.C. 154(b) by 395 days.

(21) Appl. No.: 15/093,563

(22) Filed: Apr. 7, 2016

(65) Prior Publication Data

US 2016/0299060 A1 Oct. 13, 2016

Related U.S. Application Data

(60) Provisional application No. 62/146,147, filed on Apr. 10, 2015.

(51) Int. Cl.
*G01N 21/31* (2006.01)
*G01N 15/14* (2006.01)
(Continued)

(52) U.S. Cl.
CPC ......... *G01N 21/31* (2013.01); *G01N 15/1434* (2013.01); *G01N 15/1468* (2013.01);
(Continued)

(58) Field of Classification Search
CPC .... G01N 21/31; G01N 21/33; G01N 21/8507; G01N 15/1468
See application file for complete search history.

(56) References Cited

U.S. PATENT DOCUMENTS 5,272,354 A * 12/1993 Kosaka .............. G01N 15/1427
250/574
5,619,043 A 4/1997 Preikschat et al.
(Continued)

FOREIGN PATENT DOCUMENTS

EP 0289200 B2 7/1998
GB 2509716 * 7/2014 ............. G01N 21/45

OTHER PUBLICATIONS

International Search Report dated Jul. 7, 2016, for corresponding International Application No. PCT/US16/26774, 12 pages.

*Primary Examiner* — Maurice C Smith
(74) *Attorney, Agent, or Firm* — Seed IP Law Group LLP

(57) ABSTRACT

An immersion probe system is provided for simultaneously performing first analysis of a first portion of light originating from liquids and/or particles in a fluid and second analysis of a second portion of the light originating from the liquids and/or particles. The system defines an optical axis and includes a first component including a first analyzer, a window, and a first optical path extending between the window and the first analyzer. The system also includes a second component including a second analyzer, the window, and a second optical path extending between the window and the second analyzer. The system further includes a spectral selector placed in the first optical path and in the second optical path to direct the first portion of the light, which originates from the liquids and/or particles and passes through the window, to the first analyzer, and to direct the second portion of said light to the second analyzer. The system includes an illumination path that delivers illumination light or lights based on a beam(s) that passes through the window at an oblique or normal angle to the optical axis.

(Continued)

The first component and the second component share a common optical path at least between the window and the spectral selector.

21 Claims, 8 Drawing Sheets

(51) Int. Cl.
| | | |
|---|---|---|
| *G01N 21/85* | (2006.01) | |
| *G01N 21/64* | (2006.01) | |
| *G01N 21/49* | (2006.01) | |
| *G01N 21/65* | (2006.01) | |
| *G01N 21/35* | (2014.01) | |
| *G01N 21/33* | (2006.01) | |
| *G02B 27/48* | (2006.01) | |
| *G01N 21/359* | (2014.01) | |

(52) U.S. Cl.
CPC ......... *G01N 21/8507* (2013.01); *G01N 21/33* (2013.01); *G01N 21/359* (2013.01); *G01N 21/49* (2013.01); *G01N 21/6458* (2013.01); *G01N 21/65* (2013.01); *G01N 2015/144* (2013.01); *G01N 2015/1472* (2013.01); *G01N 2021/3595* (2013.01); *G02B 27/48* (2013.01)

(56) References Cited

U.S. PATENT DOCUMENTS

| | | | |
|---|---|---|---|
| 5,815,264 | A | 9/1998 | Reed et al. |
| 6,118,520 | A | 9/2000 | Hamer |
| 6,999,171 | B2 * | 2/2006 | Kusuzawa ......... G01N 15/0211 |
| | | | 356/336 |
| 7,683,299 | B2 * | 3/2010 | Patt ................ G01J 1/4228 |
| | | | 250/201.1 |
| 2004/0046954 | A1 | 3/2004 | Guy |
| 2006/0013544 | A1 * | 1/2006 | Bouma ............. G02B 6/02042 |
| | | | 385/116 |
| 2007/0279627 | A1 | 12/2007 | Tack et al. |
| 2009/0021724 | A1 | 1/2009 | Mahadevan-Jansen et al. |
| 2009/0251694 | A1 | 10/2009 | Knopp et al. |
| 2011/0081111 | A1 | 4/2011 | Li et al. |
| 2012/0228518 | A1 * | 9/2012 | Rigneault ................ G01J 3/02 |
| | | | 250/458.1 |
| 2013/0016336 | A1 | 1/2013 | Xie |
| 2014/0177034 | A1 | 6/2014 | Lippey et al. |

* cited by examiner

1. WINDOW
2. PROBE HOUSING TUBE
3. PROBE CAMERA HOUSING
4. BEAM STEERING DEVICE
5. FIBER TERMINATION
6. ILLUMINATION FIBER
7. FORWARD OPTICAL ASSEMBLY
8. SPECTRAL SPLITTER
9. REAR OPTICAL ASSEMBLY
10. IMAGE SENSOR
11. ILLUMINATION SOURCE
12. POWER AND COMMUNICATION

8. Spectral Selector
30a. Switchable filter, bandpass passing only the laser line to path 34.
10. Image Sensor
30b. Second filter is a notch filter passing all spectra except the laser line to path 34.
31. Actuator moves the filters in and out.
32. Actuator control signals.
33. Connection to computer.
34. Optical path to image sensor.

8. Interference filter passing only the laser line to path 16 and remaining spectrum to second path 17.
10. High resolution image Sensor
16. Optical path to high resolution image sensor.
17. Optical path to fiber coupling.
18. Optical fiber.
19. Fiber connection to spectrometer.

8. Spectral Selector
10. High resolution image sensor
24. Interference notch filter cuts the laser line to path 25, remaining spectrum directed to path 26.
25. Optical path to image sensor.
26. Second optical path to optical fiber coupling.
27. Interference high-pass filter cuts the laser line and all shorter wavelengths.
28. Optical fiber.
29. Fiber connection to spectrometer.

8. Interference beamsplitter passing only the laser line to path 16 and remaining spectrum to path 17.
10. High resolution image sensor
16. Optical path to high resolution image sensor.
20. Second optical path to second high resolution image sensor.
21. Imaging optics for second path.
22. Second high resolution image sensor.
23. Power and communication for second image sensor.

1. WINDOW
3. HOUSING
4. BEAM STEERING DEVICE
5. FIBER TERMINATION
6. ILLUMINATION FIBER
11. ILLUMINATION SOURCE
52. SCRAMBLER
53. SCRAMBLER
54. SECOND ILLUMINATION FIBER

SYSTEM AND METHOD FOR SIMULTANEOUSLY PERFORMING MULTIPLE OPTICAL ANALYSES OF LIQUIDS AND PARTICLES IN A FLUID

BACKGROUND

Technical Field

The present application relates to particle and liquid analysis and, more specifically, to a system and method for simultaneously performing multiple optical analyses, such as an imaging analysis and a spectral analysis (a composition analysis, etc.), of liquid and particles in a fluid.

Description of the Related Art

Imaging devices are used to monitor chemical and biological reactions and other processing of small and large molecules suspended in a fluid. For example, a fluid containing particles is sampled, and brought to a charge coupled device (CCD) image sensor, a fluorescence microscope, or other imaging devices to view the particles being developed, modified, or otherwise processed in various chemical, biological or mechanical processing such as polymerization, cell growth, fermentation, milling, etc.

Additionally, various types of spectrometers are used to perform spectroscopic analysis of the composition and other characteristics of the liquid or liquid/particle system being processed in chemical or biological settings. Known types of spectrometers include Raman spectrometers, Fourier transform infrared spectroscopy (FTIR) spectrometers, Fluorescence spectrometers, Near Infrared (NIR) spectrometers, and Ultraviolet (UV)-visible spectrometers.

BRIEF SUMMARY

In typical chemical, biological, and other particulate process settings, imaging devices and/or spectrometers are used off-line, wherein a fluid sample containing particles is taken from a processing vessel (e.g., a chemical reactor, a bioreactor, a pipeline) and observed outside of the vessel using an imaging device or a spectrometer.

In addition, though less common, there are several probe based systems, such as a single imaging device or a single spectroscopic device, which can be used inside of the vessel, e.g., a Near Infrared (NIR) spectroscopy probe and a Raman spectroscopy probe. These individual probing techniques require individual installation points and individual maintenance. Therefore, maintaining and using two or more of these probes would be not only costly and cumbersome, but in the case of small scale processing, users simply would not have adequate space to install all of the preferred probe analytics.

A need exists for a single system and method for simultaneously performing multiple optical analyses, such as an imaging analysis and a spectral analysis (a composition analysis, etc.), of liquids and particles in a fluid using both an imaging device and a spectrometer. Such system and method would be advantageous in providing a single installation point for the multiple optical analyses. The system and method are also advantageous in simultaneously capturing both image information and spectral information of the liquid and particles being processed, at the same measurement point. Then, the simultaneously captured image information and spectral information can be combined or correlated to provide additional information, which is useful to quantize or qualify various aspects of the process, such as composition information, particle size information, particle shape information, and particle count information.

Embodiments of the invention are directed to providing a system and method for simultaneously performing multiple optical analyses, such as an imaging analysis and a spectral analysis (a composition analysis, etc.), of liquids and particles in a fluid. The system includes a first component (e.g., an imaging component) and a second component (e.g., a spectrometer component), wherein the two components share a common optical path leading to/from an observation window to be placed adjacent to the particles to be observed. The portions of the two components sharing the common optical path can therefore be formed into an elongated probe having a thin profile resembling a wand. A user may readily dip the probe into each of many vessels used in a chemical, biological, or particulate processing environment to simultaneously perform two or more optical analyses (e.g., both imaging and spectroscopic analysis) of the liquid and particles within each of the vessels, successively, in real time. For example, some biological facilities have hundreds of such vessels each processing cells that need to be monitored. The system and method of the invention, which are highly suited for on-line (in-process), real-time applications, are particularly advantageous in these settings that involve numerous vessels each containing particles to be monitored.

DETAILED DESCRIPTION

Figure 1:
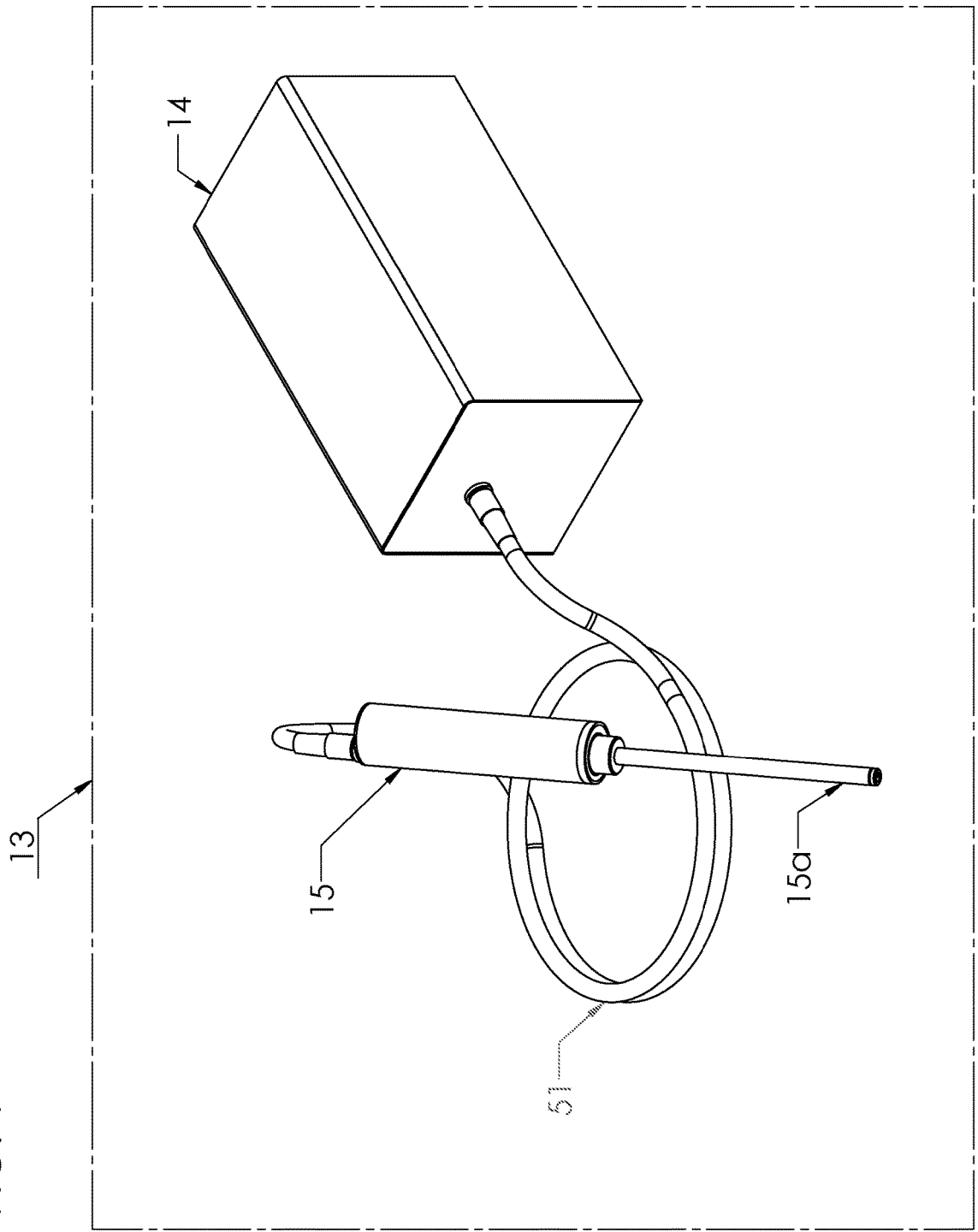
FIG. 1 is a perspective-view diagram of a simultaneous multiple optical analyses system including an enclosure and a probe connected by a conduit, according to one embodiment of the invention.

FIG. 1 is a perspective view diagram of a simultaneous multiple optical analyses system 13, for example a simultaneous imaging and spectroscopic analysis system according to one embodiment. The system 13 includes an enclosure or housing 14 and a probe 15, which are connected by a flexible conduit 51.

The probe 15 in the illustrated embodiment has a long slender tubular section 15a that can be inserted into fittings or ports commonly provided at reaction vessels, fermentation vessels, pipelines and other types of containers used for chemical and biological experiments. The probe 15 may include a handle portion having a larger diameter than the slender tubular section 15a, which is suited to be held by an operator's hand. The probe 15 houses optical components and an image sensor or sensors that can be configured to measure various physical and chemical parameters of particles being observed. The probe may be formed of any suitable material such as resin material or metal.

The enclosure 14 may house a power supply, an illumination source or sources (e.g., a laser at 532 nm or 535 nm, for example, or a combination of lasers at the same or different wavelengths, a high-power LED Broadband source or a combination of LEDs that cover different wavelengths, or other collimated or low-divergent light source or a combination of such sources), a USB hub, and synchronization circuit, to be described in more detail in reference to FIG. 7 below. In one embodiment, connections for the power supply (e.g., main power 100-240 VAC; 38 in FIG. 7) and for the USB hub (e.g., a USB 3.0 port; 39 in FIG. 7) are provided on the back panel of the enclosure 14 (not visible in FIG. 1). Operation of the enclosure 14 may be controlled by a separate computer (not shown) connected by the USB 3.0 port, for example.

Figure 2:
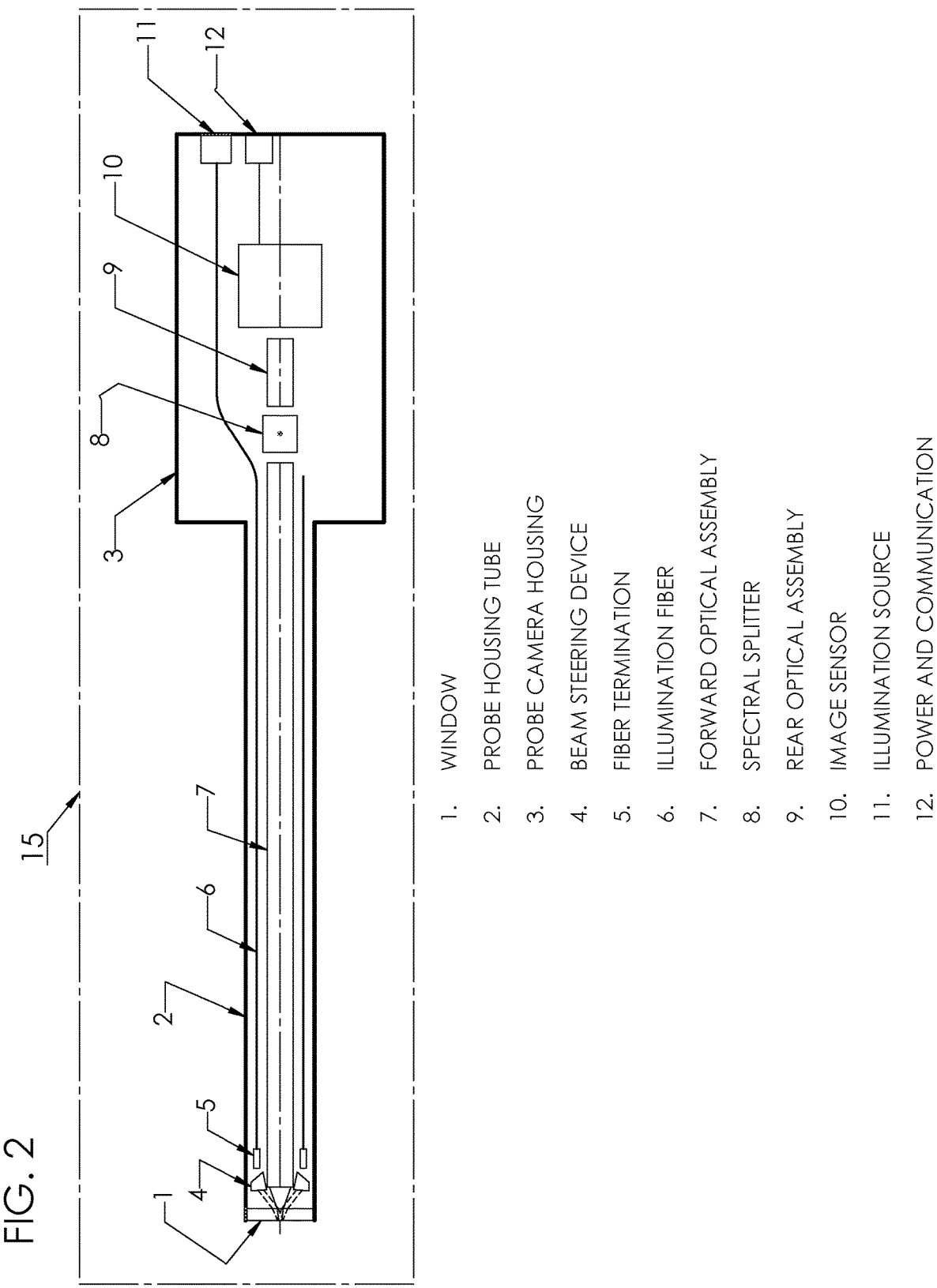
FIG. 2 is a block diagram of a probe of a simultaneous multiple optical analyses system according to an exemplary embodiment, including components that are common to various further embodiments of the invention.

FIG. 2 illustrates the general layout of the probe 15 according to an exemplary embodiment, including components that are common to various further embodiments to be described in reference to FIGS. 3-6 below.

A window 1 located at the end of a probe tube 2 is intended to be immersed to be in contact with a fluid containing particles to be measured. The fluid may be a stream flowing along a linear or circular path at flow rates of up to 4 or 5 m/s, for example, or may be "static" wherein the fluid sits substantially still in a vessel. The window 1 may be formed of any suitable material that has sufficient strength and durability to protect the contents of the probe tube 2 while having optical characteristics suited to obtain images and other spectral information of the particles in a fluid. Sample window materials include sapphire, quartz, diamond, etc.

The material in the vessel (i.e., a fluid that contains, is presumed to contain, or will eventually contain, particles) is illuminated by light from a high intensity illumination source or sources 11, for example a laser or lasers, which is housed in a probe camera housing 3 of the probe 15 in the illustrated embodiment. In other embodiments, the illumination source or sources 11 may be provided outside the probe 15 and housed in the enclosure 14 (see FIG. 1) of the overall system 13. The light from the illumination source or sources 11 is carried by an optical fiber or fibers 6 to a fiber termination or terminations 5 and passes through a beam steering device or devices 4 (e.g., a prism), resulting in a beam(s) that passes through the window 1 at an angle relative to a central axis of the probe 15, as illustrated in FIG. 2. The angle may be between 0 and 90 degrees relative to the central axis according to various embodiments. In some embodiments the beam incident on the window 1 may be a low-divergence beam whose width is approximately the same as or slightly larger than the width of an imager's aperture divided by the magnification factor M. Use of a low-divergence beam may be preferred in some embodiments to maintain the maximum energy density while still illuminating the field of view. In other embodiments the beam incident on the window 1 may be a divergent beam.

The illuminated zone just outside of the window 1 is observed by a forward optical assembly 7, which magnifies and relays the light (e.g., an image of the observed material) to a spectral selector 8. The forward optical assembly 7 may be comprised of a combination of optical lenses, prisms, stops/apertures, and other optical elements, as will be apparent to those skilled in the art.

The spectral selector 8 may be any optical element or a combination of optical elements suitable for selecting a desired portion of the light originating from the observed material, such as a band-pass filter, a band-stop (notch) filter, a dichroic mirror, a wave guide, and any combinations thereof. In some embodiments, the spectral selector 8 functions as a spectral splitter to split the incoming light into a first portion of the light spectrum (e.g., a portion suitable for imaging) along a first optical path, and into a second portion of the light spectrum (e.g., a portion suitable for spectroscopic analysis) along a separate second optical path.

In other embodiments, the spectral selector 8 functions to merely select a desired portion of the light spectrum for further processing, such as for imaging and/or for spectroscopic analysis at the imager 10, as illustrated in FIG. 2. For example, the spectral selector 8 may send a certain segment of the light spectrum to the imager 10, which may be used to further segment the received light as in a Bayer or hyperspectral sensor. As a further example, the use (or operational mode) of the imager 10 can be altered to make the imager 10 to function as two or more optical sensors or analytical tools depending on the mode. For example, a single sensor is configured to operate as a standard imager in one mode, and to have its sensor settings altered to process a different set of optical information/image in another mode. Different operational modes may correspond to different illumination lights at different wavelengths or at a single wavelength but at different intensities. In further embodiments, the spectral selector 8 may be used to select a desired portion of the wavelengths and/or a desired intensity level of the incoming light to be directed further down along the first optical path and/or the second optical path.

In FIG. 2, a rear optical assembly 9 in the probe camera housing 3 may provide magnification and serves to focus the magnified image on the surface of an image sensor 10, which may be a CCD sensor or a CMOS sensor, for example. The image sensor 10 may be connected to a power source and a communication device 12, which may be included in the probe camera housing 3 of the probe 15 as illustrated or may be provided outside the probe 15 and housed in the enclosure 14 (see FIG. 1) of the system 13. The image obtained by the image sensor 10 may be analyzed to quantize and qualify various aspects and characteristics of the liquid and particles being observed to determine, for example, composition, particle size, particle shape, and particle count information of the particles, in high resolution (e.g., in a submicron resolution).

In some embodiments the image sensor 10 may be a Bayer or hyperspectral filter/sensor, which collects optical information from across the electromagnetic spectrum based on illumination lights from multiple illumination sources. In other embodiments the image sensor 10 may be a monochrome imager, which may still collect spectral information based on illumination lights from multiple illumination sources operating at different wavelengths or at a single wavelength but at different intensities. As used herein, an "imager" may encompass these and various types of optical "imagers" (not limited to visible-light imagers) that are capable of collecting and processing optical information based on illumination light from a single light source or based on illumination lights from multiple light sources, in one or more operational modes. As such, the imager 10, depending on context, may mean a single imager having a single or multiple operational modes, a combination of imagers (which respectively process different spectral segments of the received light), a combination of an imager and a spectrometer (which respectively process different spectral segments of the received light), a spectrometer having a single or multiple operational modes, a combination of spectrometers (which respectively process different spectral segments of the received light), and so forth.

According to various embodiments, the simultaneous imaging and spectroscopic analysis system 13 is capable of simultaneously performing imaging of and spectral analysis (e.g., composition analysis, etc.) of liquids and particles in a fluid. The system 13 includes a first component including a first optical analyzer (e.g., the image sensor 10) and optionally a second optical analyzer (e.g., a spectrometer) and a second component including the second optical analyzer (if not included in the first component) and/or a third optical analyzer (e.g., a spectrometer). Either the two optical analyzers in the first or second component or the two components share a common optical path leading to/from the observation window 1 to be placed adjacent to the particles to be observed. As shown in FIG. 2, the portions of the first and second components (or the two optical analyzers in one of the first and second components) sharing the common optical path can be formed in the probe 15 of the system 13 having an elongated profile. The common optical path extends at least between the window 1 and the spectral selector 8. When two optical analyzers are included in the first component, the common optical path extends from the window 1 and beyond the spectral selector 8 to the first component. When two optical analyzers are respectively included in the first and second components that are separately provided, the common optical path extends from the window and terminates at the spectral selector 8, at which the received light is directed along two different optical paths to the first and second components, respectively.

The spectral selector 8 may selectively pass only a first portion of the light returned along the common optical path for imaging (and/or spectroscopic analysis), or selectively pass only a second portion of the same light (returned along the common optical path) for spectroscopic analysis, or split the same light into the first portion for imaging (and/or spectroscopic analysis) and into the second portion for spectroscopic analysis. Still further embodiments of the spectral selector 8 may select or split the incoming light into a first portion for a first type of imaging (e.g., visible imaging), into a second portion for a second type of imaging (e.g., Fluorescence microscopy imaging), into a third portion for a first type of spectroscopic analysis (e.g., Raman spectroscopy), and/or into a fourth portion for a second type of spectroscopic analysis (e.g. NIR and Uv Vis (ultraviolet-visible) spectroscopy). Various embodiments of the spectral selector 8 will be described below. Those skilled in the art will appreciate that further combinations, sub-combinations or divisions of different optical analyzers such as different types of imagers and spectrometers, which are now available or may become available in the future, can be configured to form the simultaneous multiple optical analyses system according to the present disclosure.

Figure 3:
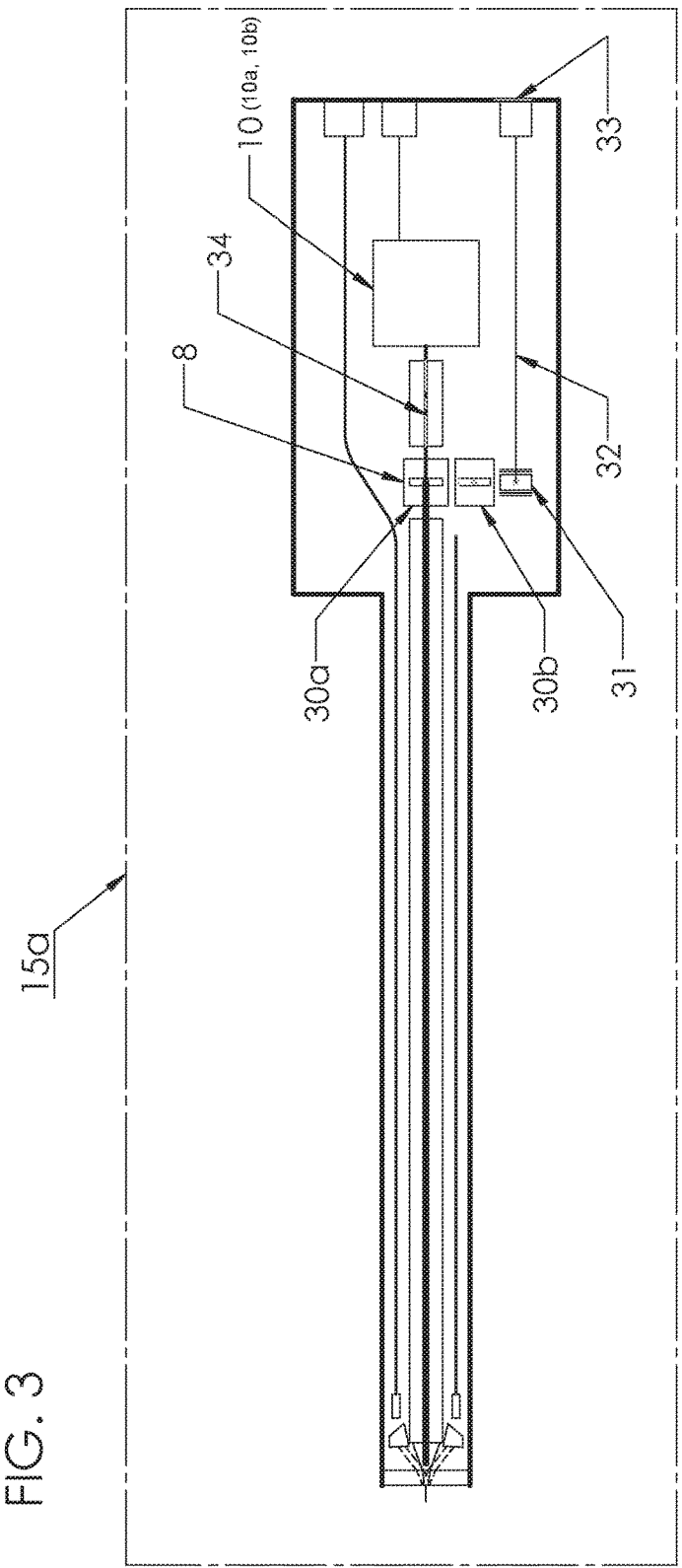
FIG. 3 is a diagram of a probe according to a first embodiment, wherein a spectral selector is formed of multiple switchable (movable) filters.

FIG. 3 is a diagram of a probe 15a according to a first embodiment, wherein the spectral selector 8 is formed of multiple switchable (movable) filters 30a and 30b.

As illustrated, the first embodiment of the probe 15a uses a single optical path between the spectral selector 8 and the image sensor 10, and changes the system function by switching between the filters 30a and 30b using a mechanical actuator 31 connected via a connection 33 to an external computer (not shown). Switching between the filters 30a and 30b causes the image sensor 10 to function as a first image sensor 10a (with the filter 30a) or as a second image sensor 10b (with the filter 30b), as will be more fully described below.

In the embodiment illustrated in FIG. 3, the first filter 30a passes only a portion of the light for imaging, such as the illumination wavelength (e.g., laser wavelength), along an optical path 34 to the high resolution image sensor 10a. For example, the first filter 30a is used to remove strong fluorescent bands, which may interfere with the imaging light.

To switch functions, a control signal 32 is sent to the actuator 31 to move the illumination stop device (notch filter) 30b into the optical path 34 while at the same time moving the first filter 30a out of the optical path 34. In this mode, the image sensor 10b receives only wavelength-shifted light, such as fluorescence or Raman emissions, to thereby function as a Fluorescence microscopy imager or a Raman imager.

In this way, a single in-line probe 15a can take the place of two imaging devices (e.g., an illumination-wavelength imager and a fluorescent/Raman imager). A further embodiment of the in-line probe 15a may include three filters, one for illumination-wavelength imaging, one for Fluorescence microscopy imaging, and one for Uv Vis imaging for example, such that a single in-line probe can then take the place of three imaging devices. The system 13 including the probe 15a is therefore capable of simultaneously performing multiple optical analyses of particles in a fluid. As used herein, the word "simultaneous" analyses means that a common optical path is shared by multiple optical analyzers (e.g., multiple imagers, multiple spectrometers, an imager and a spectrometer, etc.) to respectively perform their optical analyses. As such, "simultaneous" does not necessarily require that the multiple optical analyses be performed at the same exact timing. In the embodiment of FIG. 3, for example, the first filter 30a and the second filter 30b are not used at the same time. Rather, when the first filter 30a is positioned in the optical path 34 the first optical analysis (e.g., imaging based on the illumination wavelength) is performed, and when the second filter 30b is positioned in the optical path 34 the second optical analysis (e.g., imaging based on the non-illumination wavelengths such as fluorescence or Raman or NIR emissions) is performed. Thus, the first and second optical analyses are not performed at the same exact timing, but they are performed "simultaneously" in the sense of sharing the common optical path between the window 1 and the spectral selector 8 and using the light returned along the common optical path.

Figure 4:
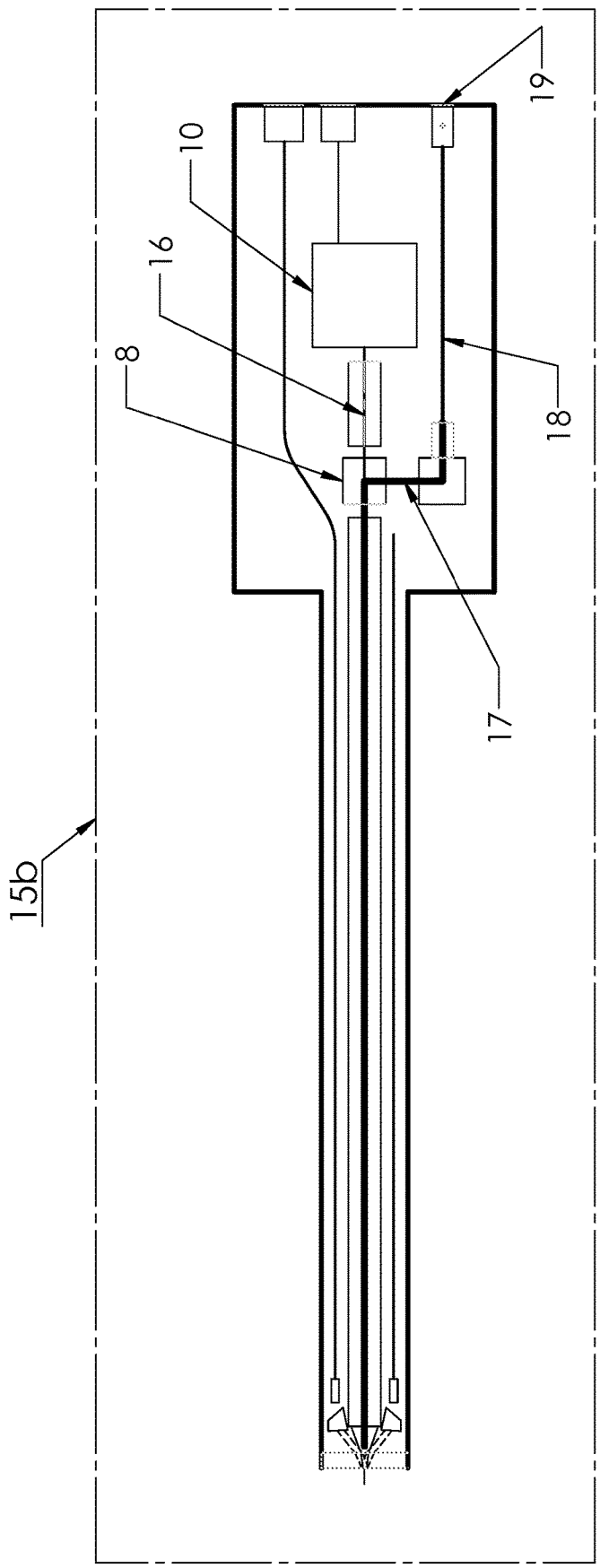
FIG. 4 is a diagram of a probe according to a second embodiment, wherein a spectral selector is formed of an interference filter.

FIG. 4 illustrates a probe 15b according to a second embodiment, wherein the spectral selector 8 is formed of an interference filter that passes only a first portion of the light, such as the illumination wavelength (e.g., laser wavelength), to a first optical path 16 leading to the image sensor 10.

In this embodiment, the spectral selector 8 is a beamsplitter, acting as a band-pass filter to pass the illumination wavelength to the first optical path 16 to the image sensor 10, and acting as a band-stop (notch) filter and a right angle mirror for the non-illumination wavelengths to direct the non-illumination wavelengths to a second optical path 17.

In the illustrated embodiment, only the illumination wavelength is passed to the first optical path 16 and focused by the rear optical assembly 9 (see FIG. 2) on the high resolution image sensor 10. In various embodiments the imaging optics are optimized for the best diffraction-limited performance at the illumination wavelength, resulting in the best resolution possible at the image sensor 10.

The remaining light (non-illumination wavelengths) is directed to the second optical path 17 and contains wavelength-shifted light, such as Raman or NIR or fluorescent emissions. This light is passed through an optical channel or coupled to an optical fiber 18 and led to an optical or fiber connection 19 to a spectrometer (not shown). The spectrometer performs analysis of the light spectrum to provide composition of the molecules in the material in the imaged zone. The spectrometer may also be used to provide information on other physical parameters and characteristics, such as particle size, particle shaped, and particle count information. While only the connection 19 to a spectrometer is included in the probe 15b in the illustrated embodiment, a relatively compact or miniaturized spectrometer, which may become available in the future, may be incorporated into the probe 15b itself.

In some embodiments, the remaining light directed to the second optical path 17 is sent, for example, to a simple intensity measurement device, which is one type of spectral analysis/measurement device. Thus, as used herein, the word "spectrometer" means various types of spectral analysis/measurement devices including conventional spectrometers, such as Raman spectrometers and Uv Vis spectrometers, as well as simpler spectral analysis/measurement devices such as intensity measurement devices.

In further embodiments, the remaining light that is split by the spectral selector 8 (beamsplitter in the illustrated embodiment) and directed to the second optical path 17 is sent to another imager, such as a Raman imager or a Fluorescence microscopy imager, via an optical or fiber connection 19. In other words, the destination of the second optical path 17 is not limited to a spectrometer and may be another imager different from the image sensor 10, to which the first optical path 16 is directed.

In still further embodiments, wherein the illumination source 11 is a broad band illumination source, the spectral selector 8 may be a beamsplitter to split the broad band into a first band portion along the first optical path 16 leading to the image sensor 10 and into a second band portion along the second optical path 17 leading to another optical analyzer (e.g., another imager or a spectrometer) via an optical or fiber connection. In low-intensity light environments, the splitting may be performed time-divisionally to direct 100% of the first band portion of the broad band to the first optical path 16 then to direct 100% of the second band portion of the broad band to the second optical path 17. In environments with enough light intensity, on the other hand, the spectral selector 8 may split the broad band spectrum to direct the first band portion to the first optical path 16 and the second band portion to the second optical path 17 at the same time. Further alternatively, in environments with enough light intensity, the intensity may be split into two and the entire broad band having 50% intensity is sent to the first optical path while the entire broad band having 50% intensity may be sent to the second optical path. Still further, the splitting may be performed both in terms of the wavelengths and in terms of intensity. It should be apparent that the intensity split is not limited to 50%-50% and different intensity levels may be assigned to the first and second optical paths, respectively, depending on a particular application. For example, the light returned from the material being observed may be split in terms of its spectrum wavelengths (e.g., to a laser spectrum portion and a non-laser spectrum portion) and/or in terms of its intensity (e.g., a 50% intensity portion and another 50% intensity portion, a 70% intensity portion and a 30% intensity portion, etc.)

Figure 5:
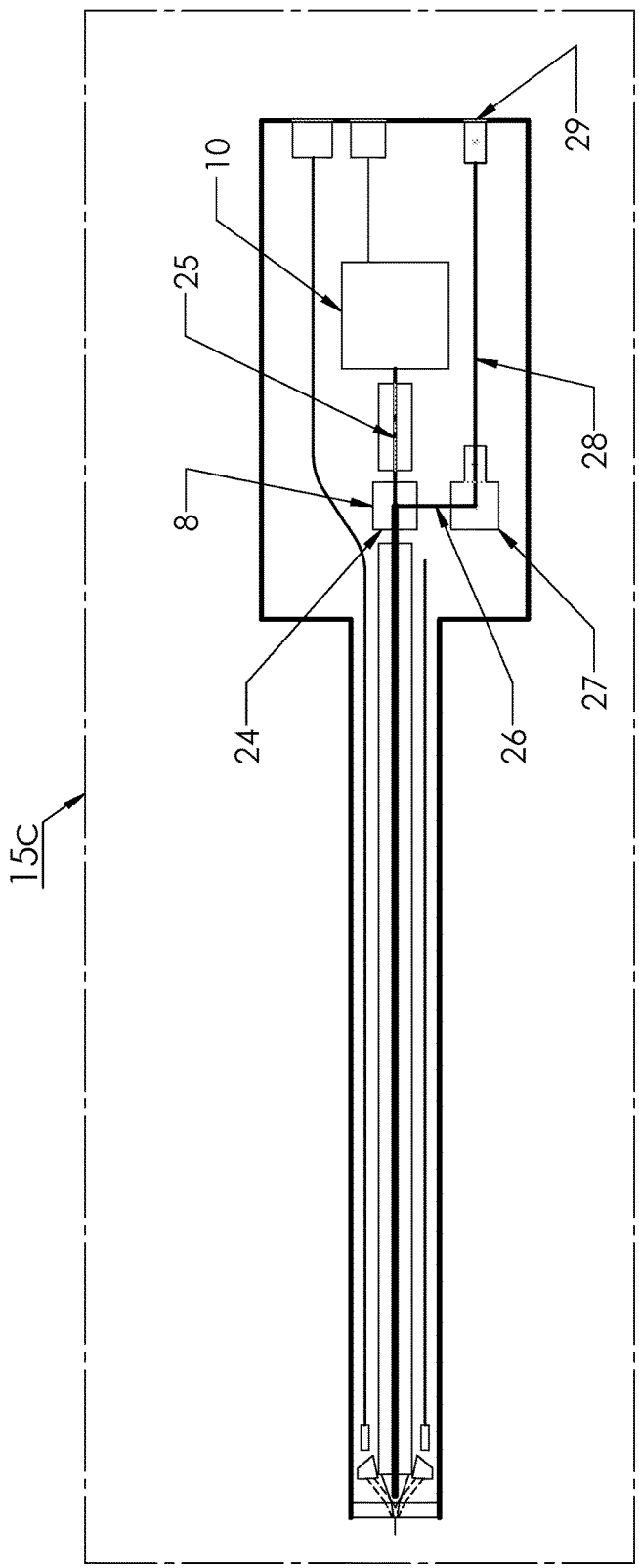
FIG. 5 is a diagram of a probe according to a third embodiment, wherein a spectral selector is formed of an interference notch filter.

FIG. 5 illustrates a probe 15c according to a third embodiment, wherein the spectral selector 8 is formed of an interference notch filter 24.

This embodiment is similar to the second embodiment of FIG. 4, but the configuration of the spectral selector 8 is different from that in the second embodiment.

The spectral selector 8 of the third embodiment is formed by the interference notch filter 24 in the illustrated embodiment, which stops the illumination wavelength (e.g., laser wavelength) and splits the remaining (non-illumination) optical energy between the first optical path 25 and the second optical path 26. The light going to the first optical path 25 is focused on the high resolution image sensor 10, resulting in an image from wavelength-shifted optical energy, such as fluorescence emissions.

The light going to the second optical path 26 may be further processed by an optical component 27, such as an interference high-pass filter in the illustrated embodiment, to pass only certain wavelengths that are of particular interest. The resulting selected wavelengths are then passed to an optical path or coupled to an optical fiber 28 and sent, via optical or fiber connection 29, to a spectrometer for analysis.

In further embodiments, the light going to the second optical path 26 may be further processed by the optical component 27 to be sent to another imager, such as a Raman imager or a Fluorescence microscopy imager, via the optical or fiber connection 29. In other words, the destination of the second optical path 26 is not limited to a spectrometer and may be another imager.

Figure 6:
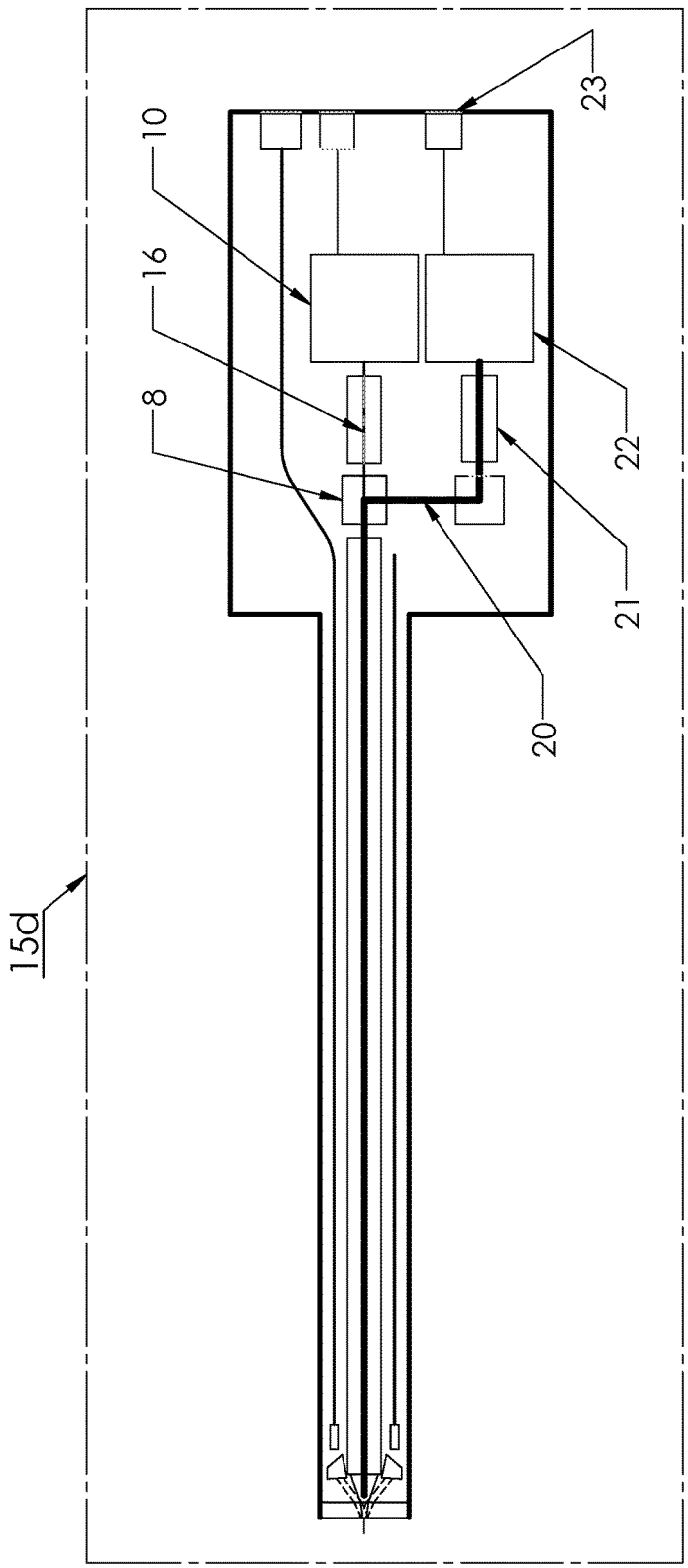
FIG. 6 is a diagram of a probe according to a fourth embodiment, wherein a spectral selector is formed of an interference beamsplitter.

FIG. 6 illustrates a probe 15d according to a fourth embodiment, wherein the spectral selector 8 is formed of an interference beamsplitter.

In this embodiment, the spectral selector 8 serves the same function as in the second embodiment of FIG. 4, but the second optical path is processed differently.

As in the second embodiment, only the illumination wavelength (or predominantly the illumination wavelength plus some selected wavelength(s)) may be passed to the first optical path 16 and focused by the rear optical assembly 9 (see FIG. 2) on the high resolution image sensor 10.

The remaining light, or a portion thereof, is directed to the second optical path 20 and passes through a second set of imaging optics 21, which focuses the light on a second image sensor 22. In one example, the second image is created with wavelength-shifted light, such as fluorescent emission, scattered from the same observed material (e.g., particles) as the first image.

As one example, the second image formed by the second image sensor 22 (e.g., a fluorescent image) may be compared to the first image formed by the first image sensor 10 (e.g., a regular, illumination light based image), side by side or in an overlapped manner, to determine which objects or features visible in the regular image created fluorescence observable in the fluorescent image. Thus, the comparison allows a user to observe differences in the composition of the objects, which are otherwise visible only in the fluorescent image, in the regular image also.

Figure 7:
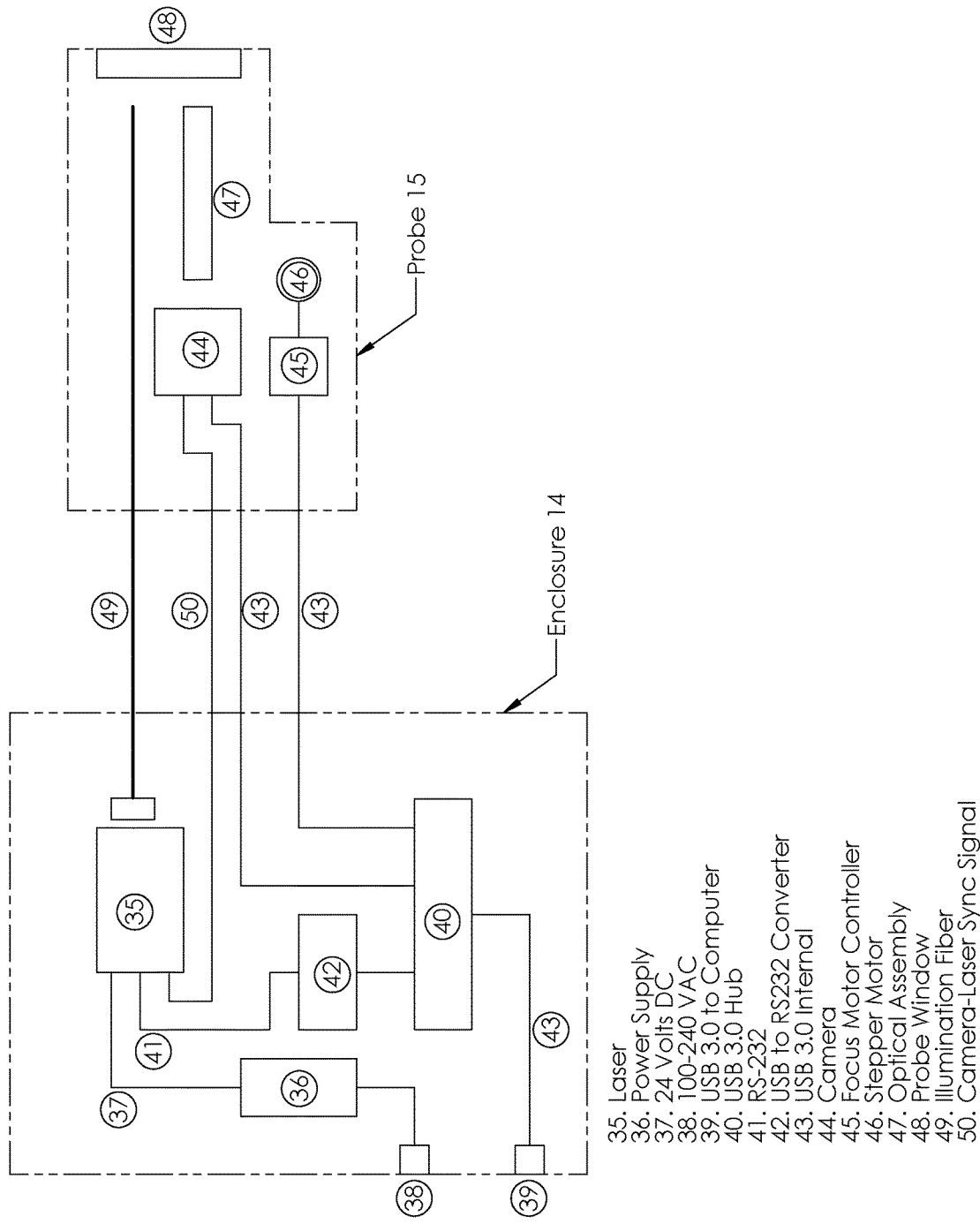
FIG. 7 is a block diagram which shows typical connections between the major components of a simultaneous multiple optical analyses system including a first (e.g., imaging) component and a second (e.g., spectrometer) component, according to various embodiments of the invention.

FIG. 7 is a block diagram that shows typical connections between the major components of the simultaneous multiple optical analyses system 13, according to one embodiment.

The system 13 includes two sections, the enclosure 14 and the probe 15 (see FIG. 1). The flexible armored conduit 51 (see FIG. 1) protects electrical cables 43 and 50 and the optical fiber 49 that connects the probe 15 to the enclosure 14.

The enclosure 14 houses the illumination source 35, for example a laser (e.g., a semiconductor laser, YAG laser, etc., in 488-635 nm range, such as at 532 nm or 535 nm) or a combination of lasers, LEDs, etc.

The power supply 36 converts AC input 38 voltage (e.g., 100-240 VAC) to DC regulated voltages 37 (e.g., 24 Volts DC) for internal use. The system is controlled by a computer (not shown), connected by high speed interface such as USB 3.0 (or Thunderbolt™, etc.) 39, which runs internally via a line 43 to a USB hub 40.

The USB 3.0 hub 40 connects various devices in the enclosure 14 and the in the probe 15 via USB (internal) lines 43 so all are directly controlled by the computer. An interface converter 42 changes (converts) USB signal to RS232 signal for connection, via a RS232 cable 41, to the illumination source 35 (e.g., laser). In the illustrated embodiment, two USB channels 43 extend from the USB Hub 40 of the enclosure 14 to the probe 15. One is for communication to a camera 44 in the probe 15, which contains the high resolution image sensor 10, and the other connects to a stepper motor controller 45 in the probe 15, which drives a stepper motor 46 to adjust the focus position of the simultaneous multiple optical analyses system 13.

The illumination source 35 (which may comprise one or more lasers, LEDs, etc.) is coupled to the optical fiber or fibers 49 and provides high intensity illumination light at the imaging zone, as described in FIG. 2. In the laser example, a direct connection 50 between the laser illumination source 35 and the camera 44 is used to transmit a camera-laser synchronization signal to trigger the laser pulse at the moment during the image sensor exposure time. Thus, operation of the illumination source 35 and operation of the camera 44 are synchronized. In other embodiments, additional circuitry may be provided to control the timing in a different way depending on a particular configuration of the multiple optical analyses system 13.

The probe 15 contains the camera 44 or multiple cameras, the probe window 48 at the tip of the probe housing tube (1 in FIG. 2), and an optical assembly 47 including the spectral selector 8 (see FIG. 2) that selects at least two portions of the incoming light from the probe window 48 for two different optical analyses, respectively, as described above in reference to FIGS. 2-6. The probe 15 also contains the stepper motor controller 45 and the stepper motor 46, described above.

Figure 8:
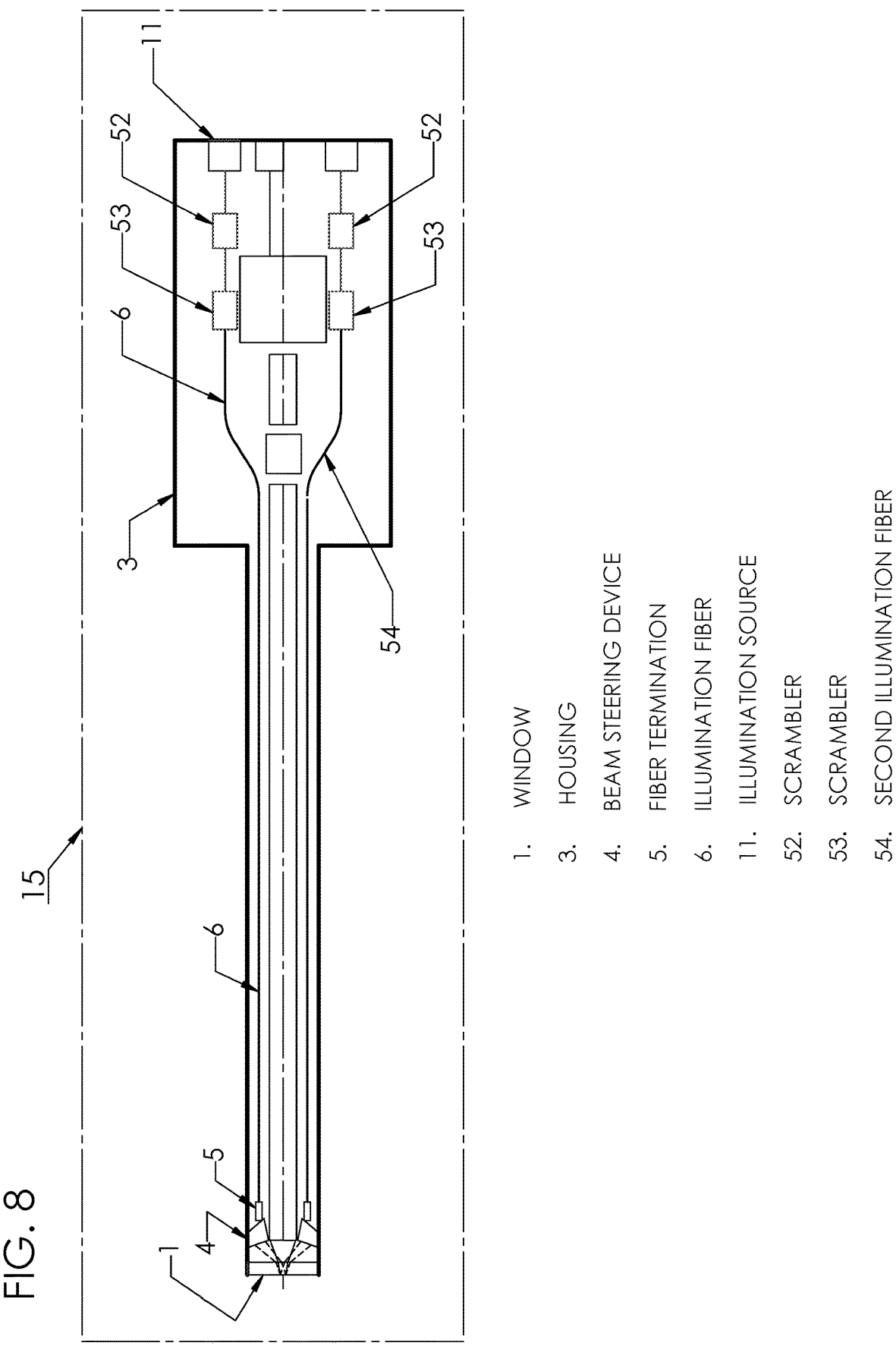
FIG. 8 illustrates a probe configured to reduce undesirable speckle that may otherwise arise over an image field, according to various embodiments of the invention.

FIG. 8 illustrates a probe 15 configured to reduce undesirable speckle that may otherwise arise over an image field. The speckle reduction configuration of FIG. 8 may be incorporated into any one of the probes described above in reference to FIGS. 2-7, to achieve speckle reduction. In FIG. 8, the same reference numerals as used previously in connection with FIGS. 2-7 refer to the same or similar elements.

When a laser is used for illumination in an imaging application, speckle may appear as a grainy intensity pattern over the image field, which could severely degrade the image. There are generally two types of optical elements that may be used to reduce speckle. A first type of optical element may be provided in the illumination light path to scramble the speckle pattern, such as a spinning disk, to thereby reduce speckle. As used herein, the first type of optical element is interchangeably referred to as a scrambler type optical element. A second type of optical element to reduce speckle, which may be provided alternatively or additionally to the first type of optical element, is configured to introduce additional spatial, temporal, or angular modes of propagation, which in turn reduces the beam coherence and hence speckle. The second type of optical element may be interchangeably referred to as a mode multiplier type optical element. In the example of FIG. 8, a mode multiplier type optical element may be inserted in series with the illumination optical fiber 6. The first and second types of speckle reduction optical elements may be formed by one or a combination of diffuser(s), prism(s), mirror(s), and/or fiber(s) with or without a spinning, vibrating, or other motion component.

FIG. 8 illustrates where the first and/or second types of speckle reduction optical elements 52 and 53 can be implemented in the probe 15. For example, a scrambler type optical element 52 may be provided, which is a miniature deformable mirror available from Dyoptyka™ of Dublin, Ireland. Another scrambler type optical element 53 may be provided, which is another mirror to provide further speckle scrambling. Alternatively, the optical element 53 may be a mode multiplier type optical element comprising a bundle of fibers provided in series with the optical fiber 6, wherein the length of each fiber in the bundle differs from all other fibers in the bundle by at least the coherence length of the laser illumination source 11. Such a multi-length fiber bundle increases the propagation modes and hence reduces the beam coherence that leads to speckle. Any combination of the first and/or second types of speckle reduction optical elements may be used to form the optical elements 52 and/or 53 in FIG. 8.

Speckle may also be reduced by directing multiple beams at different angles toward the imaging field. Adding multiple illumination fibers 54 (in addition to the illumination fiber 6) as shown in FIG. 8 provides angular diversity as an additional measure of speckle pattern averaging.

In general, speckle reduction is desirable in an illumination-wavelength imaging application.

A still further embodiment of the probe 15 may include an additional illumination channel, such as the second illumination fiber 54 as shown in FIG. 8, to capture both a fluorescence image and a back scatter image. For example, when a fluorescence microscope type of the probe 15 is excited with a first laser of 532 nm wavelength through the first illumination fiber 6, the 532 nm illumination light may be filtered out to observe, for example, the fluorescence from 540 to 700 nm. Such probe 15 may be realized in any of the embodiments described above in reference to FIGS. 2-7. The second illumination fiber 54 may be added that propagates, for example, a second laser having a wavelength within the range observed for fluorescence emission (i.e., between 540 and 700 nm in this example), such as a 635 nm laser. Then, when the second laser (635 nm) is fired at a time different than the first laser (532 nm), a resulting image that can be captured is primarily 635 nm back scatter (not fluorescence). Thus, by simply adding the second illumination source, a probe 15 can be realized that can capture both a fluorescence image (based on the first illumination source) and, though taken at a separate time, a back scatter image (based on the second illumination source). While the above described the second illumination source (e.g., 635 nm laser) as being coupled to the second illumination fiber 54, in other embodiments, the first and second illumination sources (e.g., 532 nm and 635 nm lasers) may be integrally or jointly provided to share the first illumination fiber 6 in a time-division manner.

The various embodiments described above can be combined to provide further embodiments. Aspects of the embodiments can be modified, if necessary, to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

LIST OF REFERENCE NUMBERS USED IN THE DRAWINGS

1. Window
2. Probe Housing Tube
3. Probe Camera Housing/
4. Beam Steering Device
5. Fiber Termination
6. Illumination Fiber
7. Forward Optical Assembly
8. Spectral Splitter (Spectral Component? Device?)
9. Rear Optical Assembly
10. High Resolution Image Sensor
11. Illumination Source
12. Power and Communication
13. Simultaneous Imaging and Spectroscopic Analysis System
14. Enclosure
15. Probe
16. Optical path to high resolution image sensor
17. Second optical path to fiber coupling
18. Optical fiber
19. Fiber connection to spectrometer
20. Optical path to second high resolution image sensor
21. Imaging optics for second optical path
22. Second high resolution image sensor
23. Power and communication for second image sensor
24. Optical component stops the illumination wavelength, splits the remaining energy between path 25 and 26
25. Optical path to high resolution image sensor
26. Second optical path to optical fiber coupling
27. Second optical component
28. Optical fiber
29. Fiber connection to spectrometer
30. Second optical component stops the illumination wavelength and passes the remaining spectrum.
31. Actuator moves the optical components in or out of the optical path
32. Actuator control signal
33. Connection to computer
34 Optical path to high resolution image sensor.
35. Laser
36. Power Supply
37. 24 Volts DC
38. 100-240 VAC
39. USB 3.0 to Computer
40. USB 3.0 Hub
41. RS-232
42. USB to RS232 Converter
43. USB 3.0 Internal
44. Camera
45. Focus Motor Controller
46. Stepper Motor
47. Optical Assembly
48. Probe Window
49. Illumination Fiber
50. Camera-Laser Sync Signal
51. Conduit
52. Scrambler
53. Scrambler
54. Second Illumination Fiber

The invention claimed is:

1. A system for simultaneously performing first analysis of a first portion of light originating from liquids and/or particles in a fluid to make a first measurement of the liquids and/or particles and second analysis of a second portion of the light originating from the liquids and/or particles to make a second different measurement of the liquids and/or particles, wherein the first measurement is an imaging measurement or a spectroscopic measurement and the second different measurement is an imaging measurement or a spectroscopic measurement, the system defining an optical axis and comprising:
a first component including a first analyzer that makes the first measurement, a window, and a first optical path extending between the window and the first analyzer;
a second component including a second analyzer that makes the second different measurement, the window, and a second optical path extending between the window and the second analyzer;
a spectral selector placed in the first optical path and in the second optical path to direct the first portion of the light, which originates from the liquids and/or particles and passes through the window, to the first analyzer to make the first measurement, and to direct the second portion of said light to the second analyzer to make the second different measurement; and
a fluid-immersible probe, the probe including the window at its distal end, the probe further including an illumination path that delivers illumination light or lights based on a beam(s) that passes through the window at an oblique or normal angle to the optical axis;
wherein an entire portion of the first optical path between the window and the spectral selector coincides with an entire portion of the second optical path between the window and the spectral selector such that the first component and the second component share a common optical path at least between the window and the spectral selector.

2. The system of claim 1, wherein the first analyzer and the second analyzer are an imager and a spectrometer.

3. The system of claim 1, wherein the first analyzer and the second analyzer are an imager and another imager.

4. The system of claim 1, wherein the first analyzer and the second analyzer are a spectrometer and another spectrometer.

5. The system of claim 1, wherein the first analyzer and the second analyzer are separately provided, and the spectral selector directs the first portion of the light to the first analyzer and the second portion of the light to the analyzer along two different paths.

6. The system of claim 1, wherein the first and second analyzers are integrally formed, the spectral selector includes switchable filters configured to respectively pass the first and second portions of the light to the integrally formed first and second analyzers along a single path, and the integrally formed first and second analyzers function as the first analyzer when the first portion of the light is received along the single path via one of the switchable filters and as the second analyzer when the second portion of the light is received along the single path via another one of the switchable filters.

7. The system of claim 1, wherein the spectral selector comprises switchable filters including a first filter and a second filter, the first filter being configured to direct the first portion of the light to the first analyzer and the second filter being configured to direct the second portion of the light to the second analyzer.

8. The system of claim 1, wherein the spectral selector comprises a beamsplitter configured to direct and/or select the first portion of the light to/for the first analyzer and to direct and/or select the second portion of the light to/for the second analyzer.

9. The system of claim 1, wherein the spectral selector is formed of one or more of a spectral filter, a dichroic mirror, and a wave guide.

10. The system of claim 1, further comprising a secondary spectral selector positioned in the second optical path between the spectral selector and the second analyzer, the secondary spectral selector being configured to receive the second portion of the light from the spectral selector and pass only a desired portion of the second portion to the second analyzer.

11. The system of claim 1, wherein the first portion of the light directed to the first analyzer and the second portion of the light directed to the second analyzer are split in terms of their wavelengths.

12. The system of claim 1, wherein the first portion of the light directed to the first analyzer and the second portion of the light directed to the second analyzer are split in terms of their intensity levels.

13. The system of claim 1, wherein the portions of the first and second optical paths forming the common optical path, the spectral selector, and at least one of the first analyzer and the second analyzer are housed in the probe.

14. The system of claim 11, wherein both the first analyzer and the second analyzer are housed in the probe.

15. The system of claim 11, further comprising a power source and a light source in the probe.

16. The system of claim 1, wherein the first analyzer and the second analyzer are selected from a group consisting of an image sensor, a back scatter imager, a Fluorescence microscopy imager, a Raman imager, a hyperspectral imager, a Raman spectrometer, a Fourier transform infrared spectroscopy (FTIR) spectrometer, a Fluorescence spectrometer, a Near Infrared (NIR) spectrometer, and a UV spectrometer.

17. The system of claim 1, further comprising one or more speckle reduction optical elements that are provided in the illumination path of the illumination light or lights which are laser(s), wherein the one or more speckle reduction optical elements are selected from a group consisting of: a scrambler type optical element configured to scramble a speckle pattern, and a mode multiplier type optical element configured to add spatial, temporal, or angular modes of propagation which in turn reduces speckle.

18. The system of claim 17, wherein the one or more speckle reduction optical elements is formed of one or a combination of a spinning or vibrating diffuser(s), prism(s), mirror(s), and/or fiber(s).

19. A method of simultaneously performing multiple optical analyses of liquids and/or particles in a fluid, the method comprising:
    illuminating the liquids and/or particles through an observation window;
    receiving light originating from the illuminated liquids and/or particles back through the observation window along a single optical path;
    selecting a first portion of the light originating from the illuminated liquids and/or particles and directing the selected first portion of the light to a first optical analyzer to make a first measurement of the liquids/or particles; and
    selecting a second portion of the light originating from the illuminated liquids and/or particles and directing the selected second portion of the light to a second optical analyzer to make a second different measurement of the liquids and/or particles, wherein the first measurement is an imaging measurement or a spectroscopic measurement and the second different measurement is an imaging measurement or a spectroscopic measurement, wherein the single optical path extends entirely from the observation window to a point at which at least one of the first and second portions of the light is selected.

20. The method of claim 19, further comprising selecting a desired portion of the selected second portion of the light and directing the selected desired portion to the second optical analyzer.

21. The system of claim 1, wherein the probe includes a second illumination path that delivers illumination light or lights based on a beam(s) that passes through the window at an oblique or normal angle to the optical axis, wherein the illumination path and the second illumination path and arranged in parallel with each other and symmetrically about the optical axis.

* * * * *